(12) United States Patent
Wille et al.

(10) Patent No.: US 9,297,350 B2
(45) Date of Patent: Mar. 29, 2016

(54) OFFSHORE COMBINED POWER GENERATION SYSTEM

(71) Applicant: SINGLE BUOY MOORINGS INC., Marly (CH)

(72) Inventors: Hein Wille, Eze (FR); Sophie Boureau, Nice (FR)

(73) Assignee: SINGLE BUOY MOORINGS INC., Marly (CH)

( * ) Notice: Subject to any disclaimer, the term of this patent is extended or adjusted under 35 U.S.C. 154(b) by 0 days.

(21) Appl. No.: 14/097,632

(22) Filed: Dec. 5, 2013

(65) Prior Publication Data

US 2014/0091576 A1    Apr. 3, 2014

Related U.S. Application Data

(62) Division of application No. 12/919,883, filed as application No. PCT/NL2009/050086 on Feb. 26, 2009, now Pat. No. 8,624,416.

(30) Foreign Application Priority Data

Feb. 29, 2008 (EP) ..................................... 08152152

(51) Int. Cl.
| | |
|---|---|
| *F03B 13/00* | (2006.01) |
| *F03B 13/14* | (2006.01) |
| *F03B 13/20* | (2006.01) |
| *F03D 1/00* | (2006.01) |
| *F03D 9/00* | (2006.01) |

(52) U.S. Cl.
CPC .................. *F03B 13/14* (2013.01); *F03B 13/20* (2013.01); *F03D 1/00* (2013.01); *F03D 9/003* (2013.01); *F03D 9/008* (2013.01); *Y02E 10/38* (2013.01); *Y02E 10/725* (2013.01)

(58) Field of Classification Search
USPC ............................................................ 290/53
See application file for complete search history.

(56) References Cited

U.S. PATENT DOCUMENTS

| | | | |
|---|---|---|---|
| 3,988,592 A | 10/1976 | Porter | |
| 4,048,512 A | 9/1977 | Wood | |
| 4,208,877 A * | 6/1980 | Evans et al. ..................... | 60/495 |
| 4,447,740 A | 5/1984 | Heck | |
| 6,476,511 B1 | 11/2002 | Yemm et al. | |
| 7,038,357 B2 | 5/2006 | Goldenberg et al. | |
| 7,538,445 B2 | 5/2009 | Kornbluh et al. | |
| 8,084,873 B2 * | 12/2011 | Carter et al. ..................... | 290/42 |
| 8,174,135 B1 | 5/2012 | Roe et al. | |
| 8,264,093 B2 | 9/2012 | Moore | |

(Continued)

FOREIGN PATENT DOCUMENTS

| | | |
|---|---|---|
| CN | 1702319 | 11/2005 |
| CN | 1702319 A * | 11/2005 |

(Continued)

*Primary Examiner* — Joseph Waks
(74) *Attorney, Agent, or Firm* — Young & Thompson

(57) ABSTRACT

A combined offshore system for generating electricity includes of an offshore windmill unit with a generator for extracting power from wind and transferring it into electricity, a electricity export cable connected to the windmill for exporting produced electricity to offshore or onshore consumers, and at least one offshore wave power unit for extracting power from waves. This offshore wave power unit is characterized in that electricity produced by the wave power unit is transferred via the same electricity export cable as the electricity generated by the windmill unit.

23 Claims, 11 Drawing Sheets

(56) References Cited

U.S. PATENT DOCUMENTS

| | | | |
|---|---|---|---|
| 2003/0145587 A1 | 8/2003 | Christensen | |
| 2006/0171798 A1 | 8/2006 | Yamamoto et al. | |
| 2009/0174190 A1 | 7/2009 | Carter et al. | |
| 2010/0107627 A1* | 5/2010 | Morgan | 60/495 |
| 2011/0062713 A1* | 3/2011 | Ardoise et al. | 290/53 |

FOREIGN PATENT DOCUMENTS

| | | | | |
|---|---|---|---|---|
| EP | 1 637 733 | | | 3/2006 |
| GB | 2365385 | | | 2/2002 |
| GB | 2365385 | A | * | 2/2002 |
| GB | 2383978 | | | 7/2003 |
| GB | 2383978 | A | * | 7/2003 |
| JP | 61226572 | | | 10/1986 |
| JP | 61226572 | A | * | 10/1986 |
| WO | 94/09272 | | | 4/1994 |
| WO | WO 9409272 | A1 | * | 4/1994 |
| WO | WO 9600848 | A1 | * | 1/1996 |
| WO | 2006/010783 | | | 2/2006 |
| WO | WO 2006010783 | A1 | * | 2/2006 |
| WO | 2007/111546 | | | 10/2007 |
| WO | 2007/122376 | | | 11/2007 |
| WO | WO 2007122376 | A1 | * | 11/2007 |

* cited by examiner

OFFSHORE COMBINED POWER GENERATION SYSTEM

BACKGROUND OF THE INVENTION

1. Field of the Invention

The invention relates to a combined offshore system for generating electricity from wave motion, primarily ocean or sea waves as well as from wind, the extracted energy being converted into useful energy. Existing devices will be used to convert the wave energy into useful energy.

2. Description of the Related Art

Reference is made to the following publications: U.S. Pat. No. 6,476,511 describes an apparatus for extracting power from ocean waves that comprises a number of buoyant cylindrical body members connected together at their ends to form an articulated chain-like structure. Each pair of cylindrical members is connected to an adjacent pair by a coupling member, which permits relative rotational movement of the cylindrical members about at least one transverse axis.

U.S. Pat. No. 2003145587 describes a wind and wave energy plant, comprising a windmill with a rotor and a wave-actuated water pump that can drive a turbine. In this patent it is disclosed how by means a firmly anchored mill tower, it is possible to achieve a combination of a better utilization of the wind energy, as the mill rotor is raised to a height with strong winds, and at the same time a better utilization of the wave energy, as by pumping seawater into the mill tower and by storing the water there it is possible to achieve a large pressure drop across the turbine wheel.

WO2006010783 describes wind, wave and current power stations with different foundation solutions and methods for manufacture, transport, installation and operation of these power stations.

In plants for extraction of energy from wind and waves, the final price of the energy produced depends partly on the construction costs and partly on the overall efficiency. The known plants are generally rather complex and therefore expensive to construct, and moreover the efficiencies achieved are not optimum.

BRIEF SUMMARY OF THE INVENTION

The object of the present invention is to provide a combined offshore system for generating electricity, consisting of an offshore placed windmill unit with a generator for extracting power from wind and transferring it into electricity, an electricity export cable connected to the windmill for exporting produced electricity to offshore or onshore consumers and at least one offshore wave power unit for extracting power from waves, the electricity produced by the wave power unit being transferred via the same electricity export cable as the electricity generated by the windmill unit.

Power transmission from offshore turbines and generators is generally through an undersea cable, which is more expensive to install than cables on land, and may use high voltage direct current operation if significant distances are to be covered—which then requires yet more equipment. The offshore environment can also be corrosive and abrasive in salt water locations so the maintenance is a key issue in such installations. Repairs and maintenance are usually much more difficult, and generally more costly, than for onshore turbines. Offshore wind turbines are equipped with extensive corrosion protection measures like coatings and cathodic protection. Also the permitting procedure for installing a wave power unit can be significantly reduced in time and costs if it is not a stand alone unit but when it can be integrated into an existing or already planned windmill park or coupled to one or more wind mill units. The present invention therefore, presents the advantage for one or more offshore power units for an easier and economic permission procedure, installation, power production by using a pre-existing grid of export cables.

Another advantage of the present invention is that it enables simplified maintenance. In fact, according to the present invention a combined offshore system is installed by installing/mooring a wave power unit nearby an already placed wind mill unit, between which an energized connection is established, the wave power unit protecting the windmill from destructive water waves as well as offering a more protected landing area for a maintenance vessel around the windmill.

BRIEF DESCRIPTION OF THE DRAWINGS

The invention will now be described in further detail below by means of examples of embodiments and with reference to the schematic drawing, in which.

DETAILED DESCRIPTION OF THE PREFERRED EMBODIMENTS

Figure 1:
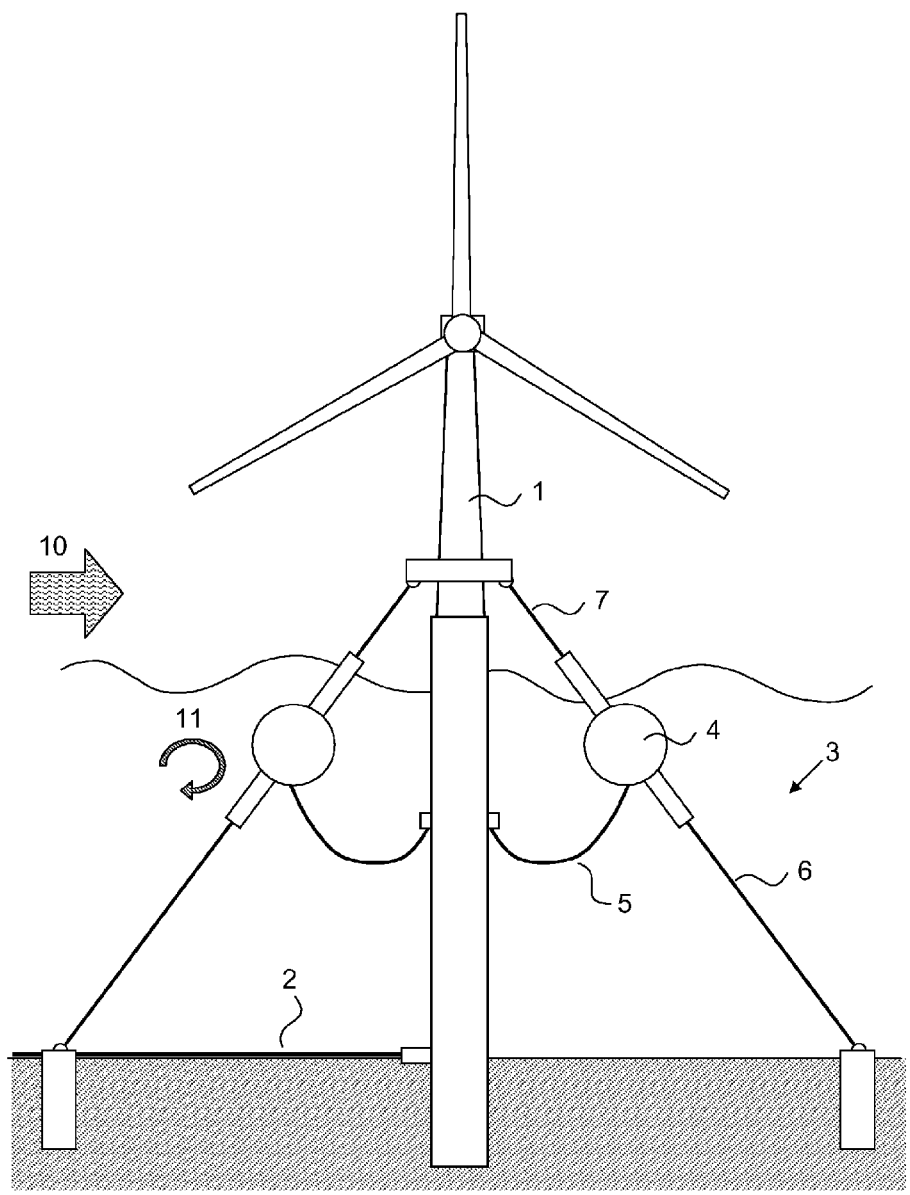
FIG. 1 shows a front view of an embodiment according to the present invention where the wave power unit comprises a Bristol cylinder.

FIG. 1 shows a front view of an embodiment according to the present invention with a windmill 1, fixed into the seabed, connected to an export cable 2 installed on the seabed and delivering electricity produced to users and/or to shore. Attached to the windmill 1, are two wave power units 3, 3' each provided with a buoyancy modules 4, 4'. Each buoyancy module 4, 4' is provided with a taut mooring leg 6 attached to the sea bed and each buoyancy module 4, 4' is also moored to the windmill 1 via a taut cable 7. FIG. 1 also shows that each buoyancy module 4 is connected to the windmill via an energized connection 5. This energized connection can be an electricity cable or a conduit carrying a fluid (hydraulics, air, seawater) that is pressurized by a linear power take off system that is placed between the buoyancy module and the taut mooring leg 6 of the wave power unit. Alternatively, the linear power take off system can be based on tubes or rolls made of Electro Active Polymers (EAP) materials as is disclosed in U.S. Pat. No. 7,038,357 or U.S. patent application Ser. No. 11/684,426. Due to the waves, the wave power unit will start rotating as shown by the arrow 11 like a Bristol cylinder and activates the linear power take off system that is connected to the taut mooring lines. The advantage of this configuration is that the windmill unit can be used as a mooring system for the wave power unit and that for example the electricity converting equipment of the wave power unit such as the generator, the transformer and/or the turbine can all be placed within the fixed windmill 1. The advantage of a configuration according the invention is that the maintenance or change out of this equipment is simplified as it is in a steady, non-moving and dry environment above water level. Another advantage is that by removing this equipment from the wave power unit, the wave power unit itself and its mooring system can be of a much lighter, simpler, more effective and less costly construction which simplifies the offshore installation of it as well.

Figure 2:
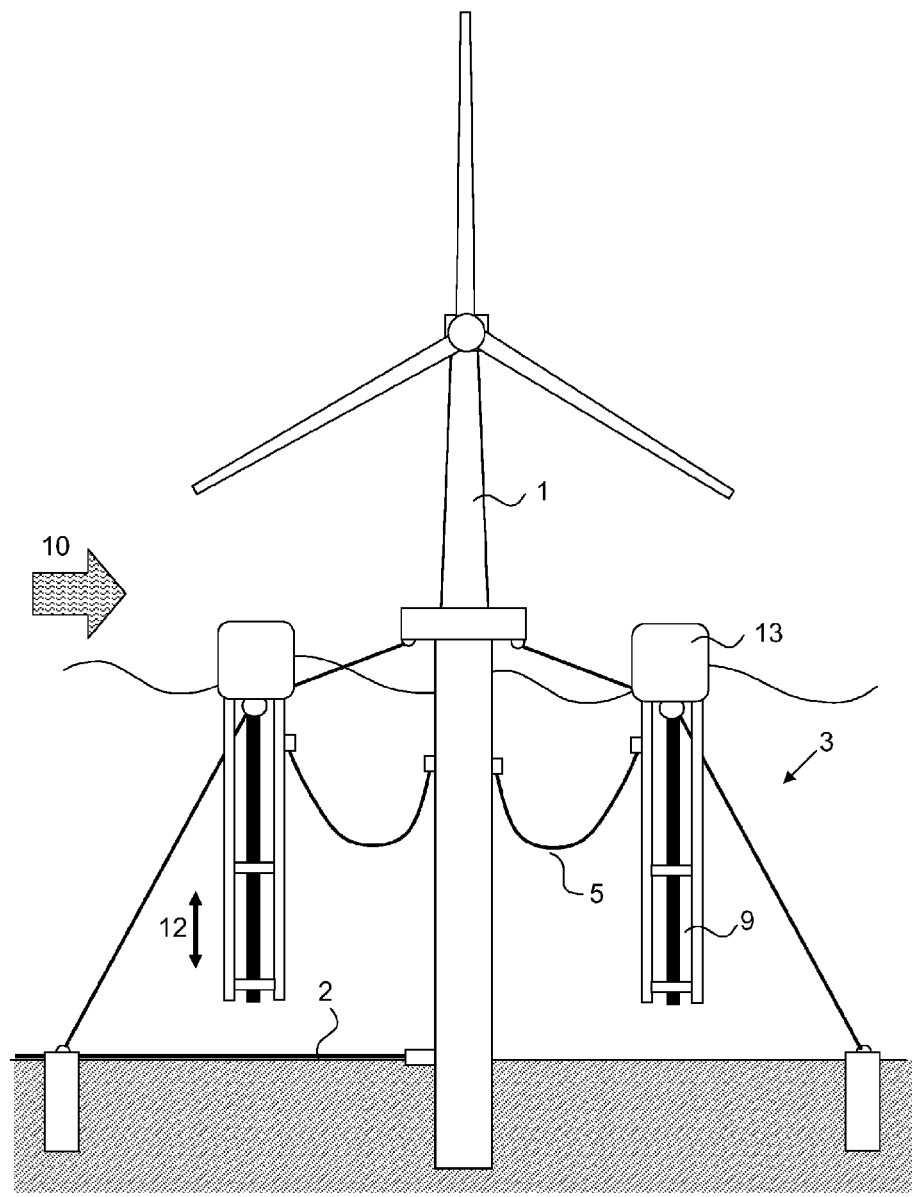
FIG. 2 shows a front view of another embodiment according to the present invention where the wave power unit comprises a hose-pump system.

FIG. 2 shows a front view of another embodiment according to the present invention. FIG. 2 shows a windmill 1, fixed to the seabed, connected to an export cable 2 installed on the seabed and delivering electricity produced to an offshore consumer, like a platform, or to onshore consumers. Attached to the windmill 1 are two wave power units 3, 3' each provided with a hose pump system 9. Each power unit 3, 3' is moored to the sea bed and is attached to the windmill 1 to fix its position relatively to the windmill. The hose-pump is a slender hollow elastomeric cylinder capable of pumping fluid when it is extended and contracted. In this embodiment, the hose-pump is connected to a buoy 13; hence wave action can be harnessed to produce pressurized fluid via cyclic extensions and contractions of the stretchable hose pump. As shown in FIG. 2, the wave action (see arrow 10) causes the hose-pump 9 to go up and down (arrow 12). FIG. 2 also shows that each wave power unit is connected to the windmill 1 via an energized connection 5. This energized connection can be a conduit carrying the fluid that is pressurized, this pressurized fluid being converted into electricity via a hydro-power turbine and generator (not shown) within the windmill 1. Alternatively, the energized connection is an electricity cable which transfers electricity produced by the turbine and generator placed within the wave power unit, to the windmill unit.

Figure 3:
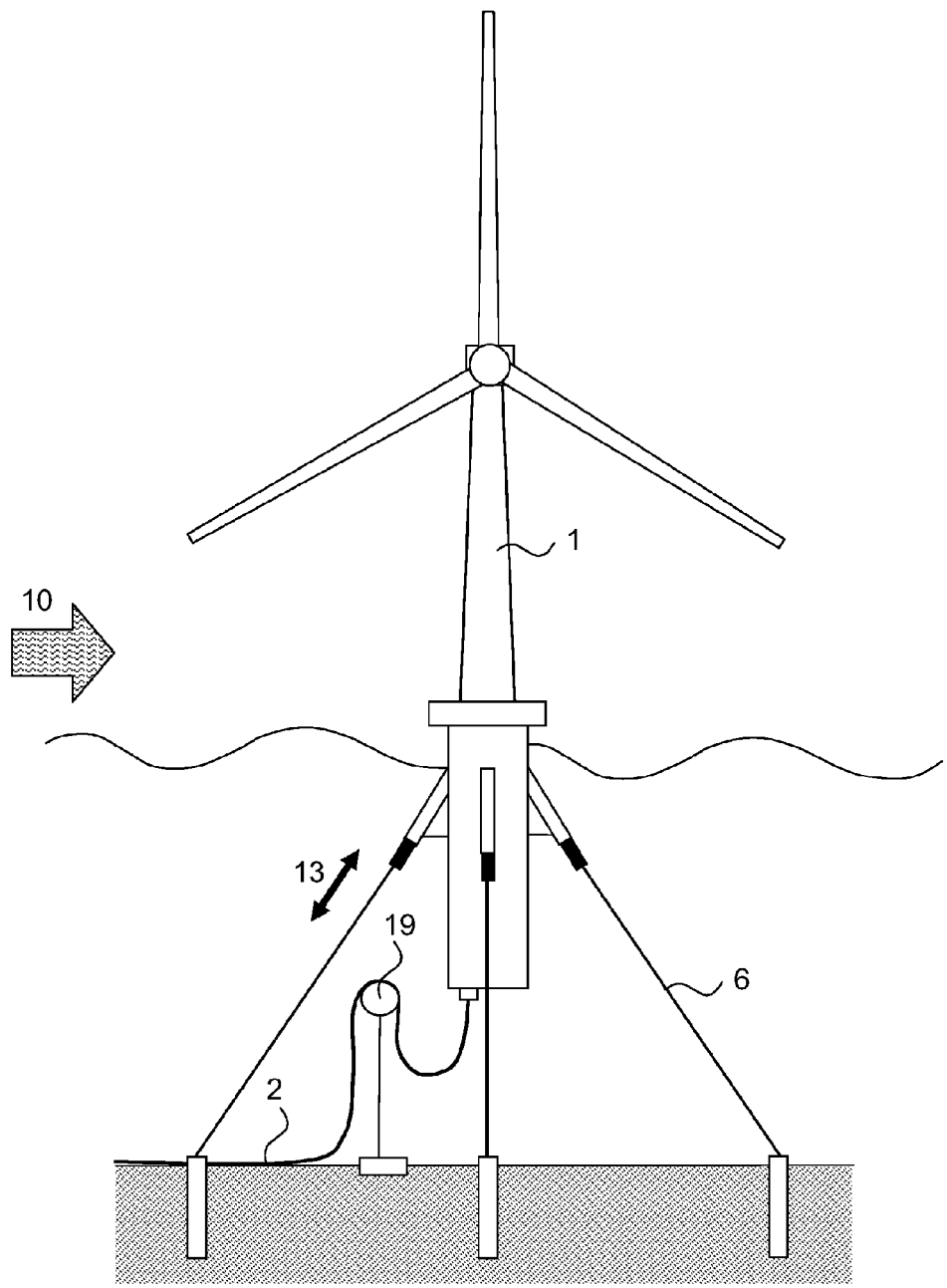
FIG. 3 shows another embodiment according to the present invention where the windmill is taut moored to the seabed.

FIG. 3 shows another embodiment according to the present invention where the windmill is floating and is taut-moored to the seabed. In this embodiment, the windmill will react to the waves action (arrow 10) as a point absorber. Point absorbers are usually axi-symmetric about a vertical axis. The windmill 1 will operate in a vertical mode and rises and falls with the passing waves and interacts with the seabed through the taut mooring lines 6 (see arrow 13), which are connected to a linear power take off system which, as mentioned before, can be based on hydraulics, pressurized air or seawater, tubes or rolls made of Electro Active Polymers (EAP) materials. In this embodiment, the windmill is connected to a power export cable 2. The export cable has a "lazy S" configuration as it extends toward the sea bottom via an intermediate buoy 19. From the intermediate buoy the export cable stretches in a gentle curve toward the seabed bottom.

Figure 4:
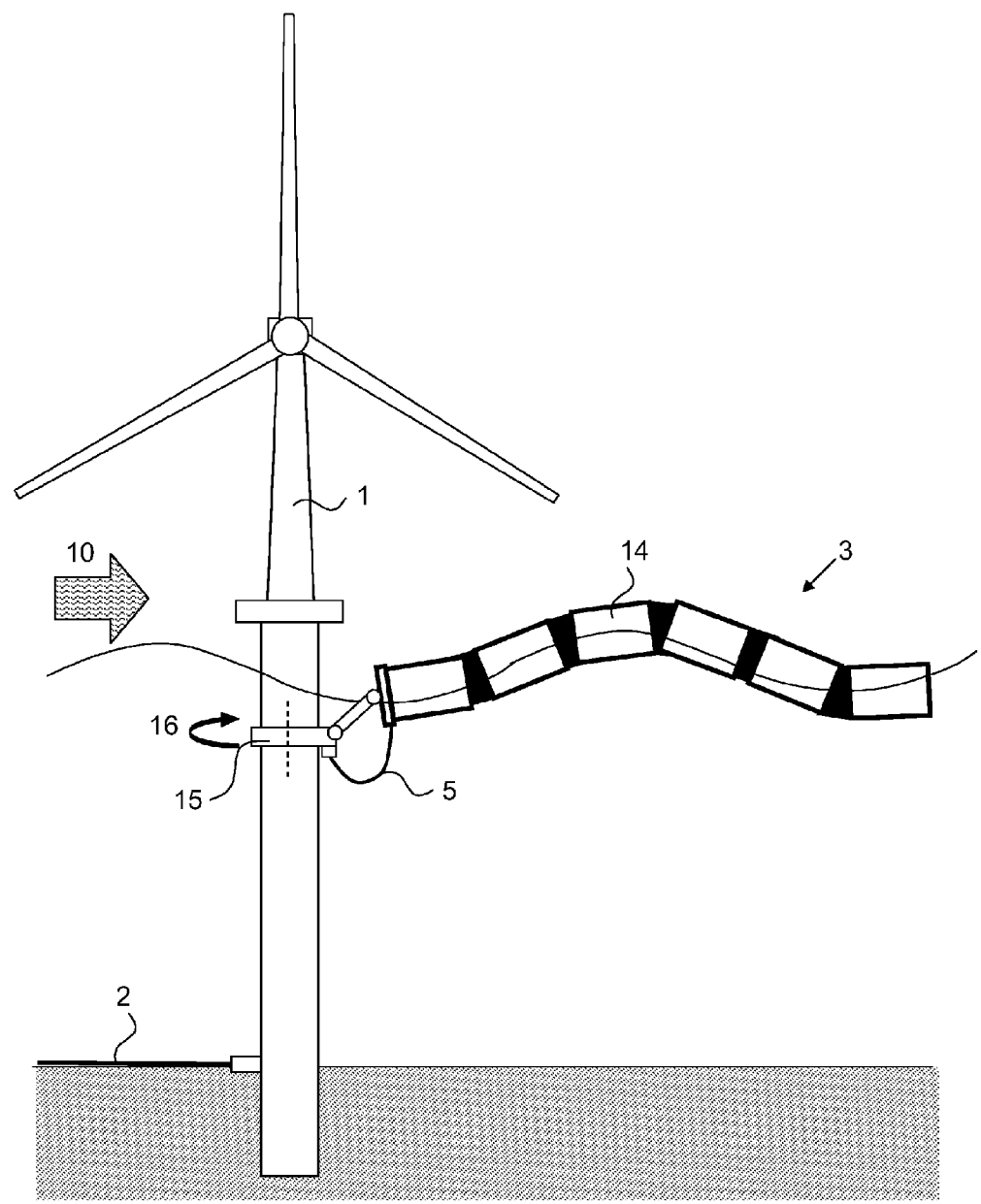
FIG. 4 shows another embodiment according to the present invention where the wave power unit comprising an articulated chain-like structure of buoyant bodies.

FIG. 4 shows another embodiment according to the present invention where the wave power unit is an articulated structure of interconnected buoyant bodies. FIG. 4 shows a windmill 1, fixed to the seabed, connected to an export cable 2 installed on the seabed and delivering electricity produced to users and/or to shore. Attached to the windmill 1, is a wave power unit 3 having an articulated structure of buoyant bodies 14. The wave power unit 3 is attached to the windmill via a connector 15 that enables the wave power unit to freely weathervane so to orientate itself (see arrow 16) in the most efficient direction depending on the wave direction (see arrow 10). The wave power unit is also connected to the windmill via an (swiveling) energized connection 5. This energized connection can be an electricity cable or a conduit carrying a fluid that is pressurized. In this embodiment, the wave power unit 3 consists of a series of semi-submerged cylindrical sections 14 linked by hinged joints. The wave-induced motion of these sections relatively to each other is transferred by hydraulic rams which pump high pressure oil through hydraulic motors via smoothing hydraulic accumulators. The hydraulic motors drive electrical generators to produce electricity. Power from all the joints is fed down a single cable 5 to a junction on the windmill 1. Several wave power units 3 can be connected together and linked to the windmill through a single cable 5. Alternatively, other power take off systems can be used to transfer the relative motions of the buoyant bodies into power, like the use of Electro Active Polymer materials. Another alternative is to place the wave power unit in a fixed heading position to the waves by a mooring line that connects the free end of the wave power unit to the seabed; in this embodiment the wave power unit can be placed upwind of the windmill as well (not shown).

Figure 5:
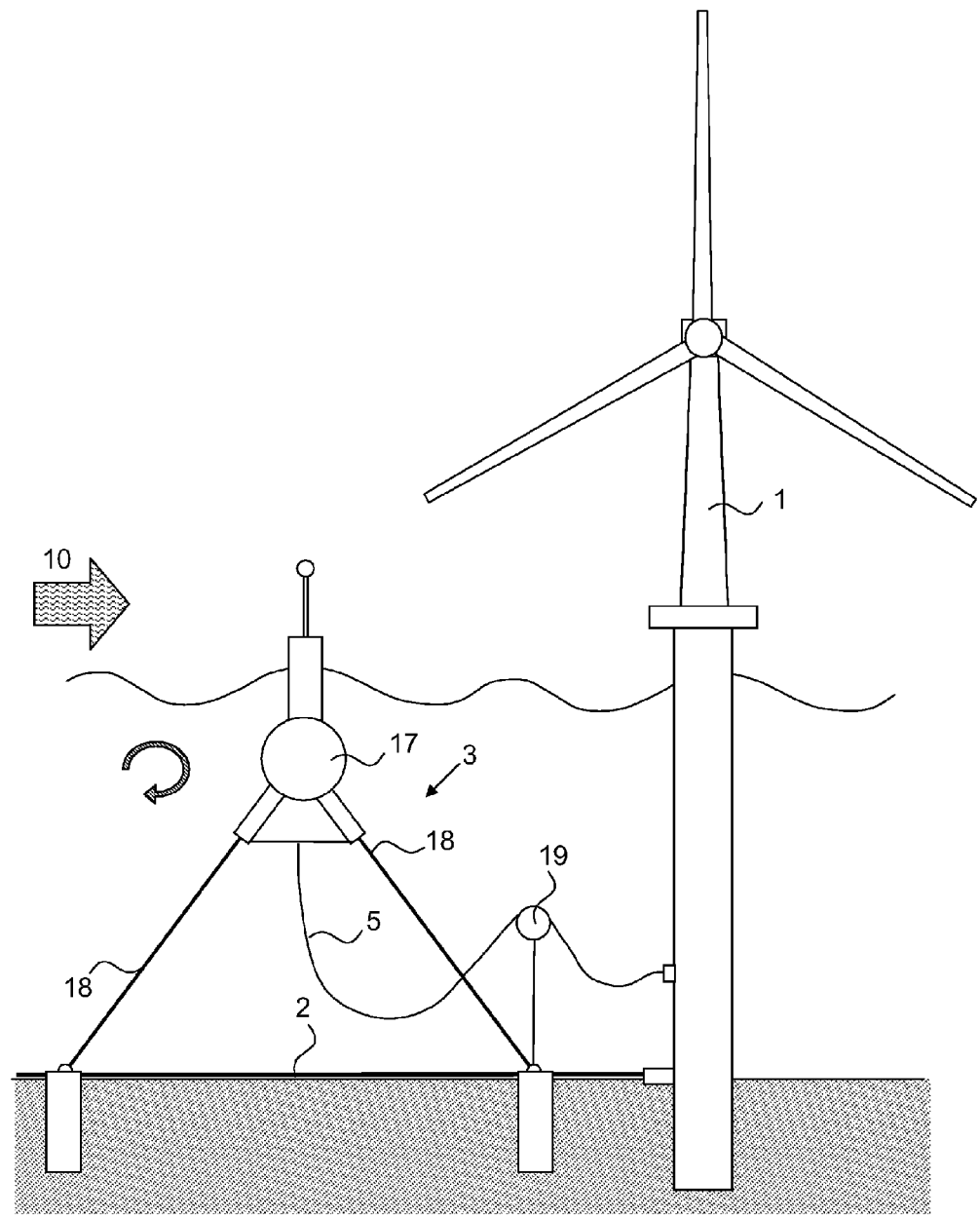
FIG. 5 shows another embodiment according to the present invention where the wave power unit has a main buoyant structure moored to the seabed with taut mooring lines and placed at a submerged, wave active depth.

FIG. 5 shows another embodiment according to the present invention where the wave power unit has a stand alone main buoyant structure 17 independently moored to the seabed with taut mooring lines 18 and placed at a submerged, wave active depth. The buoyant structure 17 can be provided with fixed buoyancy and with means to vary the surface of the buoyant structure that is exposed to the dynamic pressure of the wave, to optimize the surface for an efficient power take-off for more than one wave frequency and wave height and to maintain the tension in the taut mooring lines 18 under maximum allowable. Preferably the means to vary the surface of the buoyant structure consists of an expandable element with a variable geometry like inflatable bladders, which can be activated by a power control unit (not shown). FIG. 5 also shows a windmill 1, placed at a certain distance from the wave power unit and fixed to the seabed. The windmill unit is connected to an export cable 2 installed on the seabed for exporting electricity produced to users and/or to shore.

In this embodiment, the wave power unit 3 is not attached to the windmill 1. Each wave power unit 3 is connected to the windmill 1 via an energized connection 5. This energized connection can be a conduit carrying a pressurized fluid as mentioned before, or an electricity cable. In this embodiment the energized connection 5 has a "lazy S" configuration where the energized connection 5 extends toward the connection with the windmill 1 via an intermediate buoy 19. From the intermediate buoy 19 the energized connection 5 stretches in a gentle curve toward the windmill 1.

Figure 6:
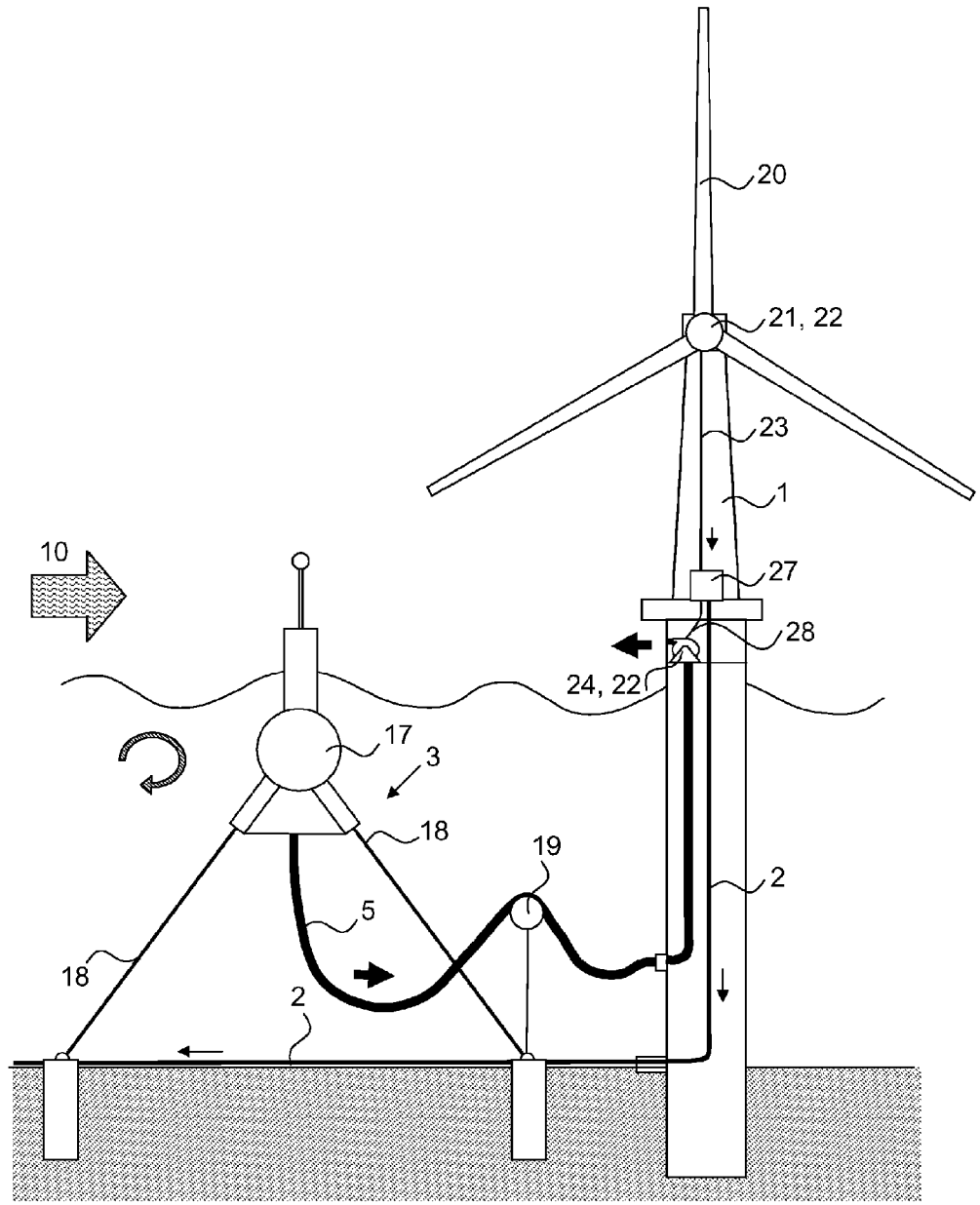
FIG. 6 shows a detailed view of the electrical transformer equipment within the windmill according to the embodiment shown in FIG. 5, and FIGS. 8-11 show top views of different multiple combined power arrangements according to the present invention.

FIG. 6 shows a detailed view of the electrical transformer equipment within the windmill according to the embodiment shown in FIG. 5. FIG. 6 shows a windmill 1, fixed to the seabed, connected to an export cable 2 installed on the seabed and exporting electricity produced to users and/or to shore. The wind strikes the set of blades 20 mounted on a shaft 21 that is free to rotate. The wind hitting the blades generates a force that turns the shaft 21, the shaft being linked to an electric generator 22 that converts the rotational kinetic energy to electricity. Electricity is transferred via an electricity cable 23 to a transducer 27 placed within the windmill, to which the electricity export cable 2 is connected. At the same time, the mechanical energy produced by the wave power unit is transferred via an energized connection 5 to a turbine 24 and generator 22 both placed within the windmill unit, to convert the mechanical energy into electricity. The electricity produced by this generator is than transferred to transducer 27 via an electricity cable 28, and from the transducer exported via export cable 2.

As the power converting equipment of the wave power unit such as the generator 22, the transformer and/or the turbine 24 can be placed within the dry environment of the fixed windmill 1 the inspection, maintenance or changed out of this equipment is eased. A clear advantage of removing this equipment from the wave power unit, is that the wave power unit and its mooring system can be of a much lighter, simpler, more effective an less costly construction, which will ease the offshore installation.

Figure 7:
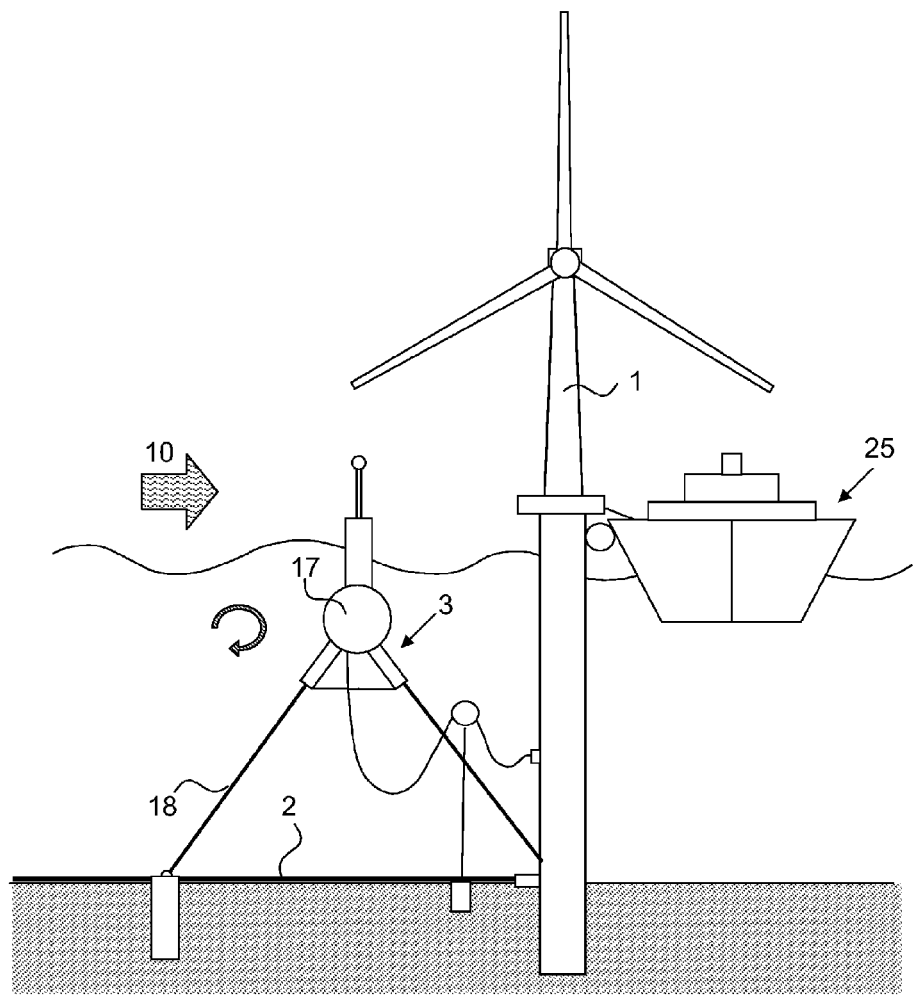

FIG. 7 shows a similar embodiment as the one shown in FIGS. 5 and 6 except that the wave power unit has at least one mooring leg moored to the windmill 1. FIG. 6 also shows that a ship such as a maintenance vessel can moor alongside to the windmill 1 on the side were no wave power units are placed. The moored wave power units function as an effective break water as they extract energy out of the waves. By placing a wave power unit next to the windmill, the windmill is protected against wave impacts and create a more protected landing area for a maintenance vessel 25 is formed around the windmill with reduced wave heights. Hence, due to this calm landing zone, the maintenance vessel will have an easier access to the combined offshore power plant and the windmill unit.

Figure 8:
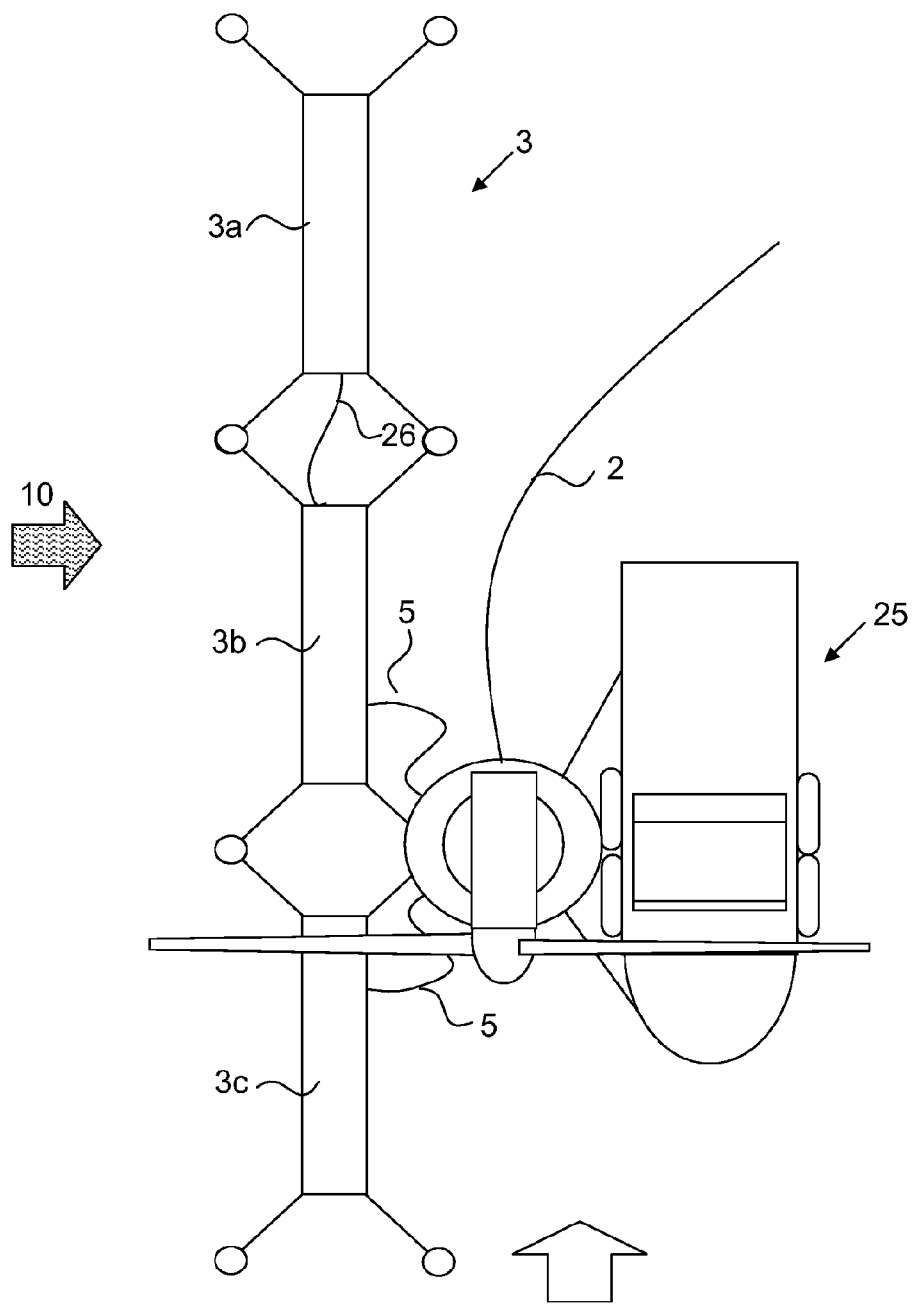
Figure 9:
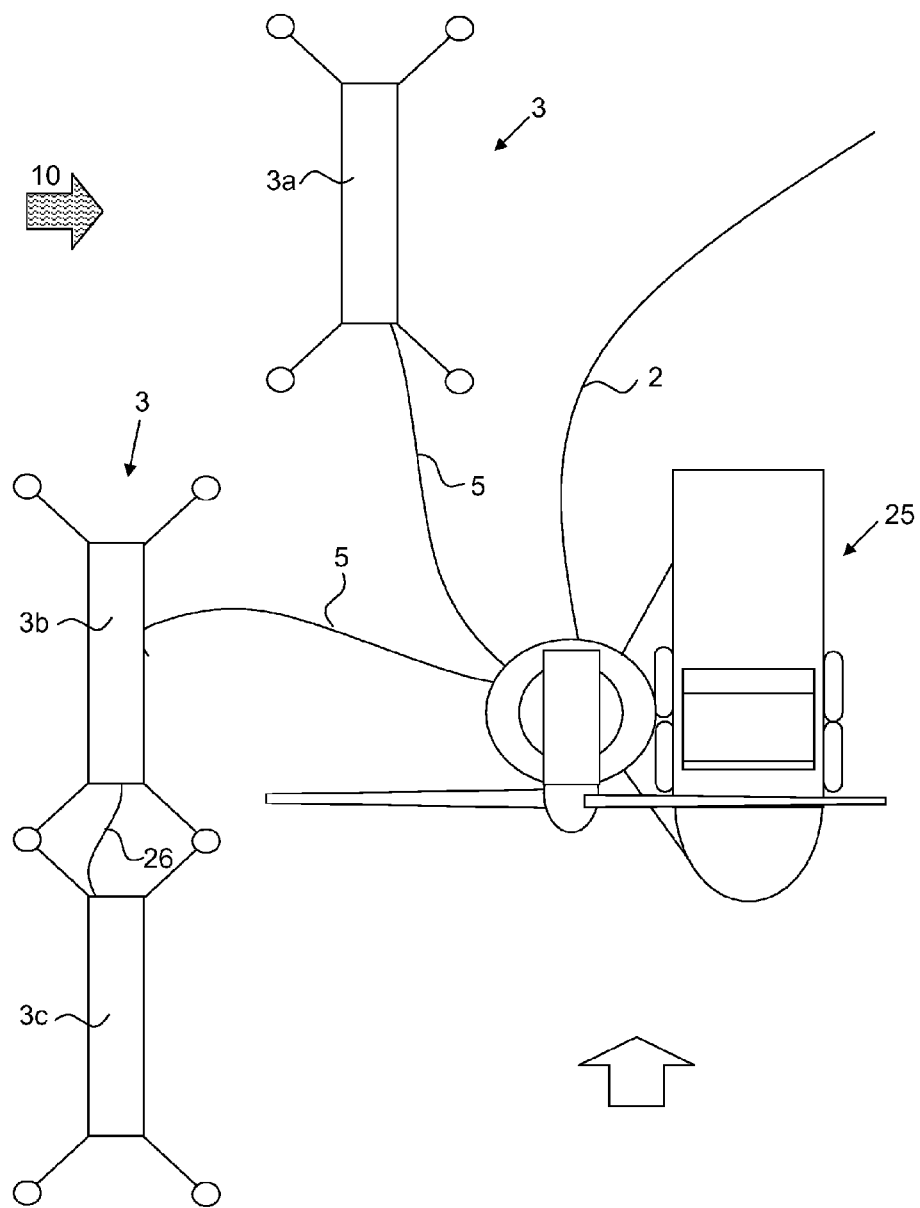
Figure 10:
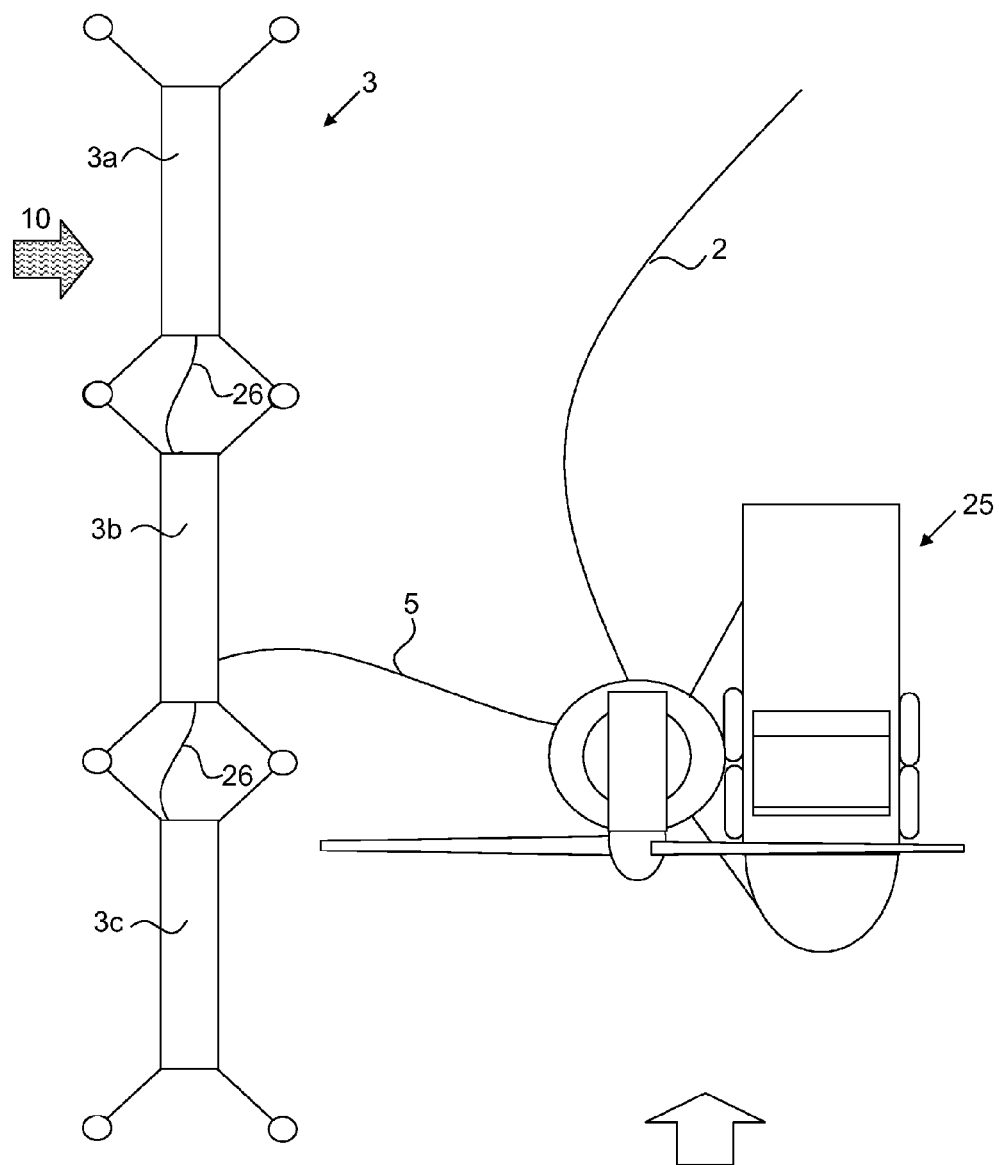

FIGS. 8, 9 and 10 are showing different top views of arrangements according to the present invention. FIG. 8 shows several aligned cylindrical wave power units 3 that are placed perpendicular to the wave direction (see arrow 10), creating a calm water landing zone for a maintenance vessel. It is shown how different power units can be interconnected to each other by an energized connection line 26, which will transfer the energy produced by one power unit 3a to another power unit 3b. The wave power unit 3b transfers the combined energy produced by the two units via the energized connection 5 to the windmill, where the energy (electricity or pressurized fluids) is converted so it can be exported via the export cable 2. FIG. 8 also shows that several wave power units (3b and 3c) can each be connected to the windmill 1 via an independent energized connection 5.

FIG. 9 shows an embodiment where a group of wave power units as well as a single wave power unit are connected to the windmill 1. FIG. 10 shows an embodiment according to the present invention where a bundle of wave power units is connected to the windmill only via one single energized connection 5.

In all figures from 8 to 10, it is also shown that whatever the configuration chosen, the wave power units can be placed so that they can act as a breakwater and create a calm water landing zone around the windmill 1 for maintenance vessel 25.

Figure 11:
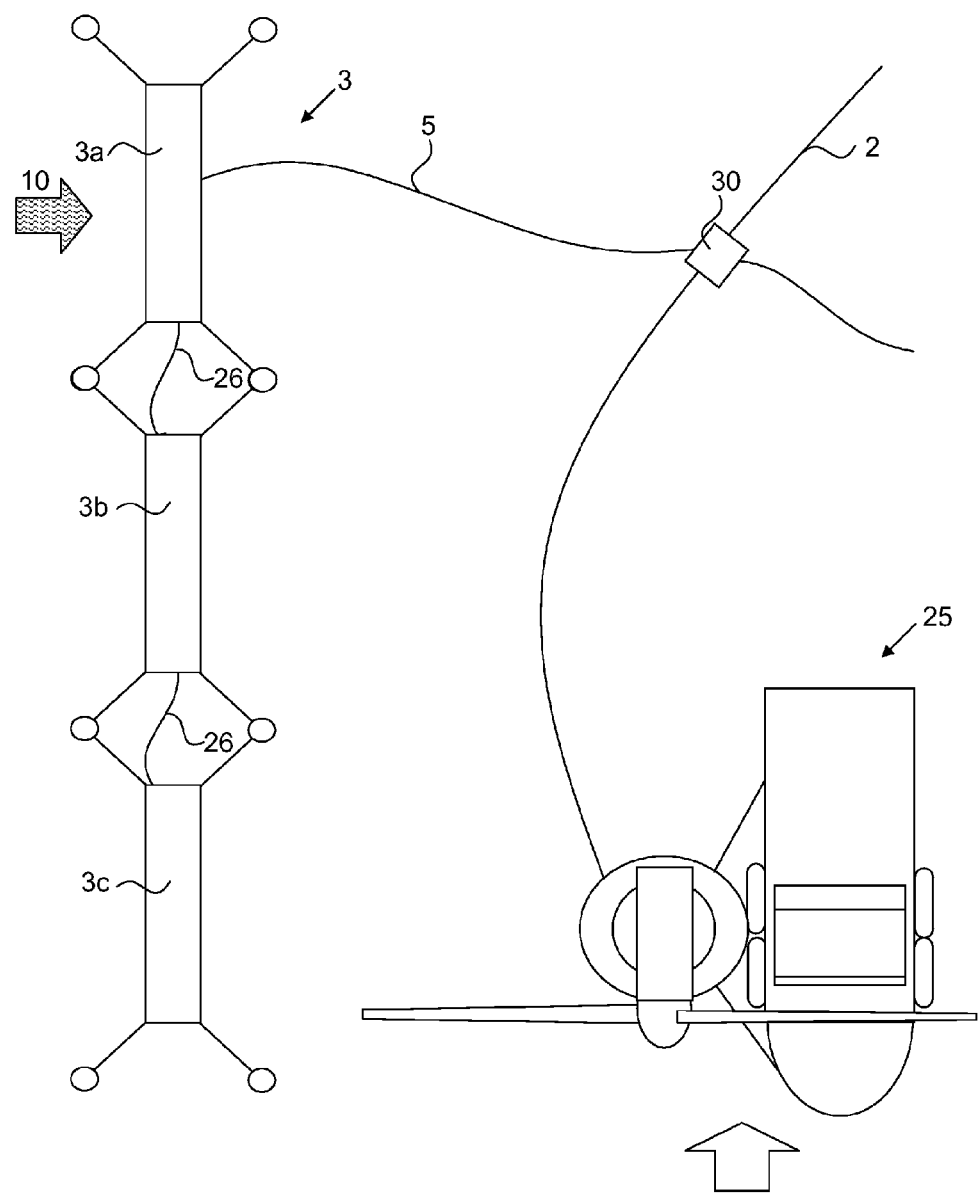

FIG. 11 shows another embodiment where several interconnected wave power units are directly connected in point 30 to the export cable 2 via a single energized connection 5. In case the energized connection is an electricity cable, the connection point 30 can be just in the form of a submerged electrical connector or for example in the form of a fixed platform that is provided with a central transformer and other electrical equipment that is needed for transferring the electricity produced by the wave power units via the export cable 2.

If the energized connection 5 is transferring a produced pressurized fluid, the connection point 30 can be provided with a turbine, a generator, a transformer and other electrical equipment that is needed to be able to convert the power generated by the wave power units into electricity and deliver it via the export cable 2.

The invention claimed is:

1. A combined offshore system for generating electricity, comprising:

an offshore windmill unit with a generator configured to extract power from wind and transfer the extracted power into electricity, the windmill unit being a floating unit;

an electricity export cable connected to the windmill unit to export produced electricity to offshore or onshore consumers; and at least one offshore wave power unit configured to extract power from waves, electricity produced by the offshore wave power unit being transferred via the same electricity export cable as the electricity generated by the windmill unit, wherein the at least one offshore wave power unit is disposed separately from the windmill unit, a horizontal distance between the windmill unit and the wave power unit being at least 5 m, the at least one offshore wave power unit includes a plurality of wave power units disposed near the floating windmill unit and configured to be disposed at or near the waterline, the wave power units being interconnected adjacent one another and aligned along a same longitudinal axis, perpendicular to a wave direction, the wave power units acting as a breakwater, and a calm landing zone is created around the windmill unit for a maintenance vessel.

2. The combined offshore system according to claim 1, wherein the offshore wave power unit is connected to the windmill unit via an energized connection.

3. The combined offshore system according to claim 2, wherein the energized connection between the offshore wave power unit and the windmill unit is a conduit carrying a fluid that is pressurized by the power take-off system of the offshore wave power unit.

4. The combined offshore system according to claim 3, wherein the pressurized fluid conduit is connected to a turbine and the generator which are placed within the windmill unit to generate electricity.

5. The combined offshore system according to claim 1, wherein the wave power unit is provided with a power take-off system and a generator that transfers power from waves into electrical power.

6. The combined offshore system according to claim 1, wherein the energized connection between the wave power unit and the wind mill is an electricity cable.

7. The combined offshore system according to claim 6, further comprising an electricity converting system of the wave power unit placed within the windmill unit, the electricity converting system converting mechanical energy produced by the wave power unit into electricity exported via the electricity export cable, the electricity export cable of the wave power unit being connected to the electricity converting system of the wave power unit.

8. The combined offshore system according to claim 7, wherein an electrical transducer of the electricity converting system is placed within the windmill unit via electricity cables, is connected to the generator of the windmill unit and the generator of the wave power unit, and is connected to the electricity export cable.

9. The combined offshore system according to claim 1, wherein the floating windmill unit is moored to the seabed with multiple mooring lines and multiple anchoring points.

10. The combined offshore system according to claim 9, wherein the mooring lines are tensioned mooring lines.

11. The combined offshore system according to claim 1, wherein a wavepower generator device is connected to or integrated in a mooring line of the floating windmill unit.

12. The combined offshore system according to claim 1, wherein, from a wave direction, the wave power unit is placed before the wind mill unit so that the wave power unit will extract energy from waves before the waves contact the windmill unit.

13. The combined offshore system according to claim 1, wherein, from a wave direction, at least two wave power units are placed before the windmill unit to extract energy out of the waves and to create a protected landing area for a maintenance vessel around the windmill unit.

14. The combined offshore system according to claim 1, wherein at least two wave power units are connected to each other via a conduit or cable, and
one of the wave power units is connected to an electrical transducer within the windmill unit.

15. The combined offshore system according to claim 1, wherein at least two wave power units are connected to an electrical transducer within the windmill unit, each one of the wave power units being independently connected to the windmill unit.

16. The combined offshore system according to claim 1, wherein at least two wave power units are connected to an electrical transducer that is placed within the windmill unit, via a connecting electricity cable that connects each wave power unit with the wind power unit.

17. The combined offshore system according to claim 1, wherein two wave power units are connected to one common anchoring point in the seabed with at least one of respective mooring line from each of the wave power units.

18. The combined offshore system according to claim 1, wherein the wave power unit is connected to an anchoring point in the seabed with at least one taut mooring line.

19. The combined offshore system according to claim 1, wherein the wave power unit is connected with at least one taut mooring line to an anchoring point at the seabed and with another mooring line connected to the windmill unit.

20. The combined offshore system according to claim 1, wherein the wave power unit comprises a taut moored unit placed at a distance from the windmill unit.

21. The combined offshore system according to claim 1, wherein the wave power unit comprises a tension-moored Bristol cylinder-type energy wave converter.

22. The combined offshore system according to claim 1, wherein the wave power unit comprises a tensioned buoyant structure with fixed buoyancy and with elements with variable geometry exposed to the dynamic pressure of the waves to optimize an overall surface of the wave power unit for an efficient power take-off for more than one wave frequency and to control tension in taut mooring lines.

23. A method of installing a combined offshore system, the method comprising:
installing one or more windmill units;
connecting the one or more windmill units to an electricity export cable;
exporting electricity produced by the one or more windmill units;
installing wave power units nearby the electricity export cable and forming an electrical connection between the electricity export cable and the one or more wave power units to export electricity produced by the one or more wave power units and the one or more windmill units via the same electricity export cable, the wave power units being configured to be disposed at or near the waterline, the wave power units being interconnected adjacent one another and aligned along a same longitudinal axis, the wave power units acting as a breakwater,
wherein the wave power units area disposed separately from the windmill unit, a horizontal distance between the windmill unit and the wave power units being at least 5 m, and
a calm landing zone is created around the windmill unit for a maintenance vessel.

\* \* \* \* \*